June 7, 1938.  R. H. TALBOT  2,119,727
MANUFACTURE OF RESIN FILMS
Filed Aug. 7, 1936
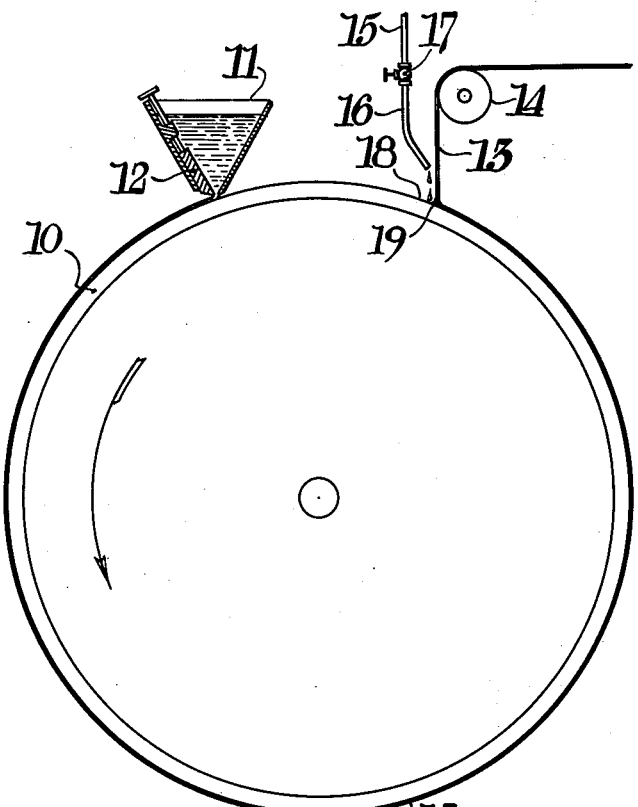
Fig.1.
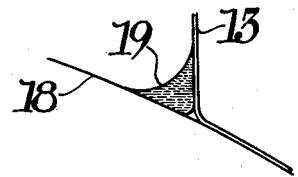
Fig.2.
Fig.4.
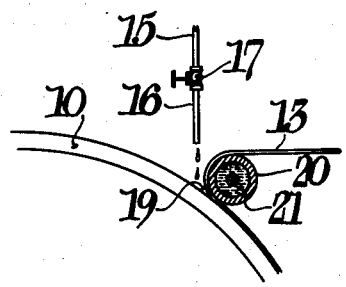
Fig.3.
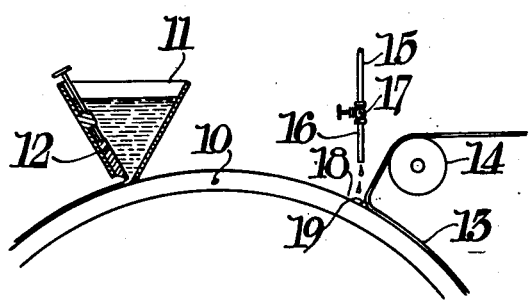
INVENTOR:
Ralph H. Talbot,
BY Newton M. Perrins
Daniel J. Mayne
ATTORNEYS.

Patented June 7, 1938

2,119,727

UNITED STATES PATENT OFFICE 2,119,727

MANUFACTURE OF RESIN FILMS

Ralph H. Talbot, Rochester, N. Y., assignor, by mesne assignments, to Eastman Kodak Company, Jersey City, N. J., a corporation of New Jersey Application August 7, 1936, Serial No. 94,834

2 Claims. (Cl. 18—57)

This invention relates to the manufacture of sheets or films formed of various colloidal and resinous materials and more particularly to a method of facilitating the removal of films composed of vinyl resins from the surface upon which they are cast.

As is well known, various types of film and sheeting are made by depositing a dope or solution of a colloidal material in a thin layer on the surface of a slowly rotating wheel or drum, removing solvents by means of heated air or other coagulating media, and finally stripping the coagulated material from the film-forming surface in a continuous sheet. At the point of stripping the film, particularly if it is resinous in nature, retains a small amount of residual solvent, causing it to be slightly tacky and to adhere tenaciously to the wheel surface. This adhesiveness is particularly noticeable in films composed of vinyl resins, and is probably due to the fact that such films retain very tenaciously small amounts of residual solvent which cause the material to adhere strongly to the wheel surface. It has been found that this adhesion tendency almost invariably results in the production of so-called "snap lines" on the film which render it defective for photographic and other uses where practically perfect transparency is required. The adhesion may in some cases be so great as to cause small portions of the film to be torn away from the main body of the film and left upon the film-forming surface.

The present invention has as its principal object to obviate the above-mentioned difficulties in the manufacture of resin sheets or films and to provide a means whereby such films may be stripped from a film-forming surface without the production therein of snap lines or similar optical defects. Another object is to provide an improved method of stripping vinyl resin films from the surface of a coating wheel such as is commonly employed in the film making industry. Other objects will appear hereinafter.

These objects are accomplished by the following invention which, in its broader aspects, comprises the application of a bead of liquid at the point at which the film is stripped from the film-forming surface. I have found, for example, that when employing a wheel for casting the film, if a liquid which is non-solvent with respect to the film, such as cold water, is placed in the V-shaped opening formed between the wheel surface and the inner surface of the film as it leaves the wheel, the film breaks away sharply without sticking or stretching or the production of "snap lines" in the product.

In the following examples and description I have set forth several of the preferred embodiments of my invention, but they are included merely for purposes of illustration and not as a limitation thereof.

In the accompanying drawing, in which like reference characters refer to like parts, Fig. 1 is a schematic elevational view of a machine adapted for the production of resinous films, particularly vinyl resin films and illustrating the manner in which the film is removed from the film-forming surface in accordance with the present invention.

Fig. 2 is an enlarged fragmentary view more fully illustrating the action of the liquid bead in assisting in the removal of the film from the film-forming surface.

Fig. 3 is a partial view similar to that of Fig. 1 in which the stripping of another type of film is shown.

Fig. 4 is another fragmentary view illustrating the use of a chill roll in conjunction with a liquid bead.

In carrying out my invention I apply a bead of non-solvent liquid to the crevice between the stripped film and the surface upon which it is formed. Water, for example, has been found to serve the purpose very well, although many other non-solvent liquids may be employed. It has been found that especially desirable results are obtained if the liquid is applied in a cool or cold condition, the film apparently being cooled by the fluid and stripping more readily in that condition. Further cooling by means of a chilled roll applied as indicated in Fig. 4 is sometimes desirable from the standpoint of further increasing the ease of stripping.

As indicated, the material employed for producing the bead should be a liquid which has no substantial solvent action upon the material of the film and should, of course, be substantially non-corrosive with respect to the metallic surface of the coating wheel or other device upon which the film is formed. In the manufacture of vinyl resin and other resinous types of film, I find that water serves the purpose extremely well, since it has no solvent action on the resinous material. Furthermore, water has the added advantages that it is cheap and also that it exerts a slight solvent-extracting effect on the film. Other liquids which may be used in accordance with the invention are members of the aliphatic series of hydrocarbons such as hexane, heptane, octane, etc. Under certain circumstances aromatic hydrocarbon such as toluene may be employed.

While I prefer to use cold water, that is, water cooled substantially below room temperature, the matter of temperature does not appear to be critical. In some cases it may be desirable to use water at temperatures above room temperature, while in other cases the temperature of the liquid may be close to the freezing point. In either case, the effect obtained is substantially the same, namely, perfect stripping of the film without sticking, snap lines or other undesirable consequences.

At this point it is desirable to point out that the action of the liquid bead is apparently not due to any difference in its temperature from that of the film material, but its action is more akin to a mechanical action in that it causes the clean cut separation of the film material from the coating surface independently of any cooling or chemical action. While I offer no explanation to account for this phenomenon, it appears that the results obtained are due to some type of physical action taking place between the liquid bead, the metal film-forming surface and the film material itself.

My invention will be more readily understood by reference to the accompanying drawing. Referring to Fig. 1, the numeral 10 designates a coating wheel of a conventional type used in the film making industry which receives from the hopper 11 a viscous dope comprising a vinyl or other resin dissolved in appropriate solvents. This dope is caused to flow upon the polished wheel surface at such a depth and speed as will produce a finished film 13 of the desired thickness, the depth of the dope at the hopper being controlled by means of a gate 12 in known manner. The wheel slowly rotates in the direction indicated by the arrow, while a current of heated air, or other coagulating medium is circulated around the wheel surface preferably in a direction counter-current to the direction of rotation, whereby solvents are removed from the film. The customary air-circulating housing is not shown in the drawing, being of a conventional design well known in the art.

The film 13 is detached or stripped from the film-forming surface when the wheel 10 has passed through about three-quarters of a revolution, being guided over roll 14 and thence to an appropriate drying apparatus (not shown). At this point, the film may contain varying amounts of residual solvent occluded therein and has varying degrees of tackiness or tendency to adhere to the film-forming surface, depending upon the particular type of resinous material of which the film is formed and also upon the amount of residual solvent. My invention has, for example, been found particularly effective in stripping films produced from such resinous materials as that sold under the trade name "Formvar" which is a vinyl acetal resin derived from the condensation of partially hydrolized polyvinyl acetate with formaldehyde, the preparation of which is referrred to in British Patent 351,082, and many others; and that sold under the trade name "Alvar" which is an acetal derived from the condensation of partially hydrolyzed polyvinyl acetate with acetaldehyde, the preparation of which is described in British Patent 351,082.

In accordance with the invention, a suitable supply of water or other non-solvent liquid is supplied from a suitable source through pipe 15, terminating in an outlet 16, the flow being controlled by valve 17. The water or other liquid is permitted to drop from the outlet 16 into the V-shaped opening formed between the film-forming surface 18 and the inside surface of the film 13, thus maintaining a liquid bead 19 at approximately the exact point of stripping. The supply of water may be continuous or intermittent, this being immaterial so long as the bead is maintained. It may be said that no great amount of liquid need be permitted to accumulate in the V, a relatively fine bead apparently being as effective as a large bead.

In Fig. 2 I have illustrated in enlarged section the further action of the liquid bead in separating the film from the film-forming surface. It will be evident that in some way, the theoretical explanation of which is not clear, the bead 19 has a very definite and positive action in splitting the film away from the film-forming surface. This is remarkable and wholly unexpected when one considers the fact that water is a mobile and easily deformable liquid.

Figure 3 illustrates the path which the film will assume in the case of certain resins which tend to cling more tenaciously to the coating surface than others. Some types of resin films will not leave the wheel until they have reached a position which coincides with a line normal to the coating surface (radial to the wheel center) and approximately tangent to the guide roll 14. This reluctance to leave the coating surface greatly aggravates the "snap back" tendency above-described, but this is, however, entirely overcome in accordance with the instant invention by the introduction of the water bead 19.

The smoothness of the stripping action may be further improved by the addition of a chill roll 20 (Fig. 4) which is preferably hollow and supplied with low temperature brine 21 or other suitable cooling medium. This tends further to harden or "set" the film before actual stripping occurs.

In carrying out the invention herein described by applying a bead of liquid at the point of stripping it is desirable that none of the liquid shall be carried up on the wheel surface from the stripping point and thus come in contact with the hopper as this would cause streaks in the film being formed. In order to prevent this carrying over of liquid from the bead, I prefer to dry the wheel surface by application thereto of a cloth pad saturated with acetone or alcohol positioned a short distance from the point of stripping in such manner as to bear lightly on the wheel surface. The acetone or alcohol absorbs any water or other liquid which may be carried up and makes certain that the surface with which the film-forming solution comes in contact is always in proper condition. Various other expedients for drying the wheel surface and preventing the carrying over of the bead liquid may be employed, as will be apparent to those skilled in the art of film manufacture.

As will be apparent, many changes may be made in the above described method of carrying out the process within the scope of my invention. It will also be understood that the invention is applicable to the manufacture of films produced from a wide variety of resins, including vinyl resins, such as polymerized polyvinyl esters, vinyl halides, and acetal condensation products of hydrolyzed vinyl esters, such as hydrolyzed polyvinyl acetate or polyvinyl alcohol with various aldehydes, such as formaldehyde, acetaldehyde, butyraldehyde, furfural and others, or mixtures thereof, as well as many other types of resinous materials.

It will also be evident that my invention is not limited to the production of films on wheel surfaces, but may also be applied to the manufacture of films on metallic endless bands, since it is obvious that a bead of liquid may be maintained at the point of stripping in such devices as well as in the wheel type of casting apparatus.

While I have found it convenient to describe my invention by the use of water as an example it is apparent that any fluid which does not have a solvent or chemical action upon the film or a corrosive action on the machinery may be used.

The herein described invention constitutes a simple, economical and highly effective solution of the problem of stripping films from their forming surfaces without damage to, or destruction of, the film or film-forming surfaces. The process is especially valuable when making films from vinyl type resins which have a pronounced tendency to stick or adhere to the surfaces upon which they are formed.

What I claim is:

1. The process of producing a sheet or film which comprises casting a solution of a colloidal material in the form of a film on a film-forming surface, removing solvent therefrom and stripping the film from the surface in a direction which provides an approximately V-shaped crevice between the film and the surface in which the vertex of the V is at least as low as any other point of the V, maintaining a supply of a non-solvent liquid in the crevice by gravity and simultaneously applying a cold roll approximately at the point of stripping but on the side of the film opposite the non-solvent.

2. The process of producing a sheet or film which comprises casting a solution of a colloidal material in the form of a film on a continuously moving film-forming surface, removing solvent therefrom and stripping the film from the continuously moving surface in a direction which provides an approximately V-shaped crevice between the film and the surface in which the vertex of the V is at least as low as any other point of the V, maintaining a supply of a non-solvent liquid in the crevice by gravity and simultaneously applying a cold roll approximately at the point of stripping but on the side of the film opposite the non-solvent.

RALPH H. TALBOT.